United States Patent
Wall et al.

[11] Patent Number: 5,479,765
[45] Date of Patent: Jan. 2, 1996

[54] TWO ELEMENT, EXTENDIBLE, LAWN EDGER BLADE COMBINATION

[76] Inventors: Albert Wall, 515 S. Crescent Ave., Lodi, Calif. 95240; G. Warren Holly, 5815 Morgan Pl. #35, Stockton, Calif. 95219

[21] Appl. No.: 405,099

[22] Filed: Mar. 16, 1995

[51] Int. Cl.$^6$ .................................................. A01D 34/84
[52] U.S. Cl. ...................... 56/256; 56/17.5; 56/DIG. 17; 172/15
[58] Field of Search ................................ 56/256, 255, 295, 56/17.5, 16.9, DIG. 17, DIG. 20; 172/15, 16; 30/276, 347, 320

[56] References Cited

U.S. PATENT DOCUMENTS

| | | | |
|---|---|---|---|
| 3,103,093 | 6/1963 | House | 56/295 |
| 3,563,015 | 2/1971 | Renfroe | 56/295 |
| 3,683,606 | 8/1972 | Staines | 56/295 |
| 3,684,027 | 8/1972 | Crawford | 172/15 |
| 3,684,028 | 8/1972 | Crawford | 172/15 |
| 3,949,541 | 4/1976 | Henry | 56/295 |
| 4,062,171 | 12/1977 | Rose | 56/295 |
| 4,229,933 | 10/1980 | Bernard | 56/295 |
| 4,471,603 | 9/1984 | Veltin | 56/295 |
| 5,014,429 | 5/1991 | McNamara | 30/320 X |
| 5,036,654 | 8/1991 | Malutich | 56/255 |

Primary Examiner—Terry Lee Melius

[57] ABSTRACT

An improved cutter blade assembly for lawn edging machines, the improvement comprising two cutting blades having the central portions of the first and second blades nested flat face against flat face and mounted on a powered drive shaft, the blades extending oppositely and outwardly from the horizontal drive shaft in a plane normal to the axis of the drive shaft. Each of the cutting blades preferably contains a series of progressively spaced, stepped mounting holes, a series of stepped locking holes, and a locking dog to provide an adjusting means for extending the combined length of the two cutting blades to compensate for wear. As the diameter of the cutter blade assembly is shortened from wear, each cutting blade may then be disengaged from the drive shaft and moved radially and oppositely outward and may then be re-engaged onto the drive shaft through the next appropriate mounting hole. Thus, the cutter blade assembly may be restored approximately to its original cutting diameter.

6 Claims, 2 Drawing Sheets

TWO ELEMENT, EXTENDIBLE, LAWN EDGER BLADE COMBINATION

FIELD OF THE INVENTION

This invention relates to a device for significantly prolonging the life of lawn edger blades.

DESCRIPTION OF THE PRIOR ART

Users of power driven lawn edging machines have had to replace cutting blades frequently as a result of wear caused by abrasion against concrete sidewalks, stones, etc. This is costly and troublesome for home gardeners, but even more for professional landscape gardeners whose machines are in daily use.

Lawn edging machines are normally provided with a powered axle and blade assembly. This enables the operator to cut a groove into the soil at the edge of the lawn as deep as he might desire. The blade is usually a flat, elongate, metal bar, the two ends of which act as cutters, even though they are mostly not sharpened. But as wear occurs the blade becomes progressively shorter until it becomes too short to cut a groove in the soil and trim the sod satisfactorily. At this time it is necessary to replace the blade.

The prior art shows many devices for replaceable cutter blades which are situated at the ends of a rotating member commonly used in lawn mowing machines. Cited for reference are a few of the many such U.S. patents:

| | |
|---|---|
| 3,683,606 - Staines | 4,471,603 - Veltin |
| 5,036,654 - Malutich | 3,684,027 and 028 - Crawford |
| 4,229,933 - Bernard | 3,103,093 - House |
| 3,563,015 - Renfroe | 3,949,541 - Henry |

However, in each of the above cited patents, in order to change blades it is necessary to remove and discard the used cutter blades and replace them with new ones, often requiring a trip to the store to purchase the new ones. What is needed is an edger blade that can be extended to compensate for wear and can be re-used several times before replacing, thus reducing cost and saving time.

OBJECTS AND ADVANTAGES

A primary advantage of the present invention is to reduce significantly the cost of providing replacement blades for lawn edging machines.

A second primary object is to provide a pair of cutting blades which may be nested and keyed together so that they may be moved radially outward with respect to the drive shaft to compensate for wear at their outer ends.

Another object is to reduce significantly the number of times required to purchase replacement blades.

Another object is to enable a lawn edger machine to cut a somewhat wider groove or trench along the edge of the turf.

Figure 1:
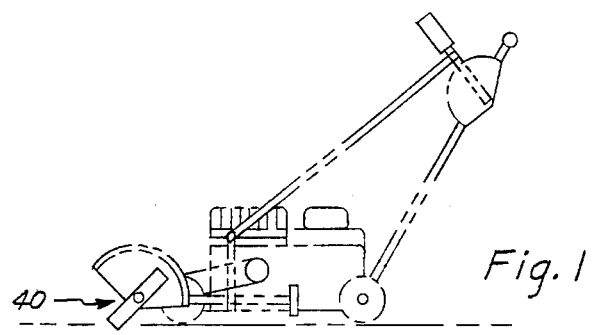
FIG. 1 is a side elevation of a typical lawn edging machine.

| REFERENCE NUMERALS IN DRAWINGS | |
|---|---|
| 20 Cutting blade | 22 Stepped mounting holes |
| 24 Stepped locking holes | 26 Locking dogs |
| 28 Extension numbers | 29 Edge Alinement markings |
| 30 Half punches | 32 Formed tangs |
| 34 Washers | 36 Mounting nut |
| 38 Drive shaft | 40 Cutter blade assembly |

DESCRIPTION

Figure 2:
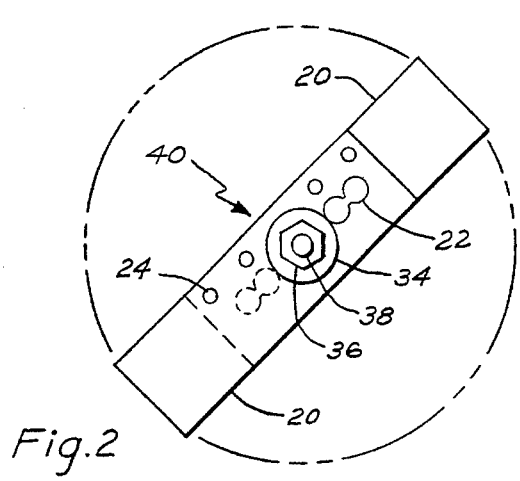
FIG. 2 is a face view of the cutter blade assembly in its initial position.
Figure 3:
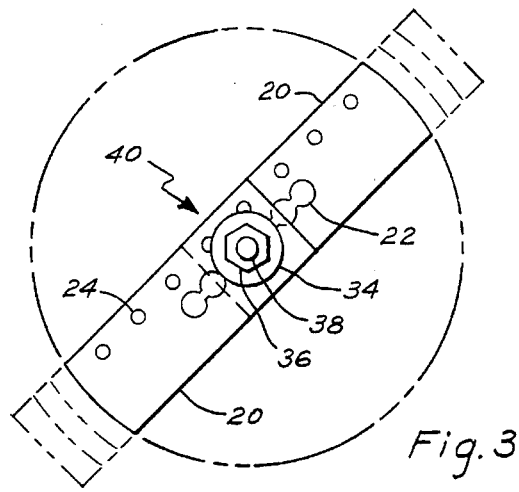
FIG. 3 is a face view of the cutter blade assembly in its fully extended position.

FIG. 1 is a side elevation of a typical lawn edging machine wherein a rotating cutter blade assembly is indicated at 40. An embodiment of the present invention is shown in FIGS. 2 and 3 where the component parts of the cutter blade assembly 40 are indicated. Included are two cutting blades 20, a drive shaft 38, two washers 34 and a nut 36.

FIG. 2 shows a cutter blade assembly 40 wherein the two cutting blades 20 are nested together in the initial position prior to use. FIG. 3 shows the the cutter blade assembly 40 wherein the two cutting blades 20 are nested together in an extended position after the blades have been shortened by wear and have been repositioned radially three times to compensate for the wear.

Figure 4:
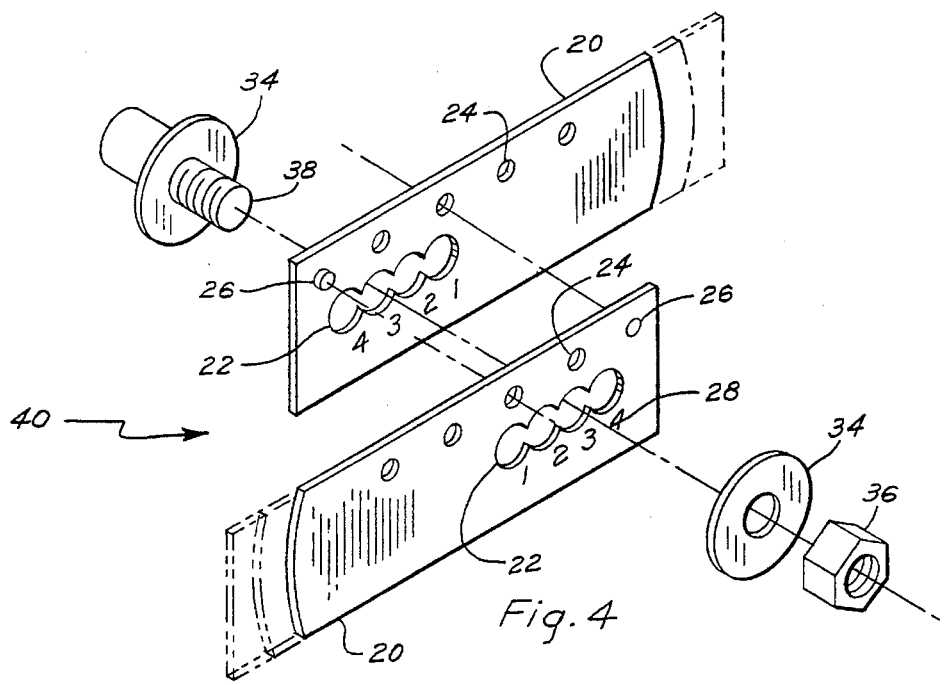
FIG. 4 is a perspective view of the cutter blade assembly exploded to show the separated parts.

FIG. 4 is a perspective view of the cutter blade assembly 40 exploded to show how the two cutting blades 20 are assembled together on the drive shaft 38 in four successive positions. The two blades 20 are identical but are assembled and nested together in reverse with respect to each other. The stepped mounting holes 22 are alined according to the selected extension number indicated at 28.

In the exploded view of FIG. 4 the two blades 20 are shown as alined for assembly on drive shaft 38 in the number 3 stepped mounting hole 22. In the example of FIG. 4 the outer ends of blades 20 have previously been worn off twice, sufficiently to warrant moving the blades 20 to the third position. Thus, the cutter blade assembly 40 has been restored to its original diameter for further use.

Each blade 20 is provided with a plurality of stepped locking holes 24 equal in number to the stepped mounting holes 22. Each blade 20 is also provided with a locking dog or stud 26 positioned to engage with a stepped locking hole 24 in the other blade 20 corresponding to the selected stepped mounting hole 22. When the two blades 20 are tightened onto drive shaft 38 by means of mounting nut 36 and washers 34, said blades are prevented from rotating with respect to each other. The two blades 20 are then held together, acting as a single unit blade since both both locking dogs 26 are engaged in stepped locking holes 24.

The stepped mounting holes 22 in each blade 20 may be marked, preferably on both faces, with extension numbers 28. Such extension numbers facilitate matching the corresponding mounting holes 22 from one blade 20 to the mating blade 20. When extension numbers are mated, e.g. one to one, two to two, three to three, or four to four, the mated number will correspond to the selected mounting hole 22.

Figure 5:
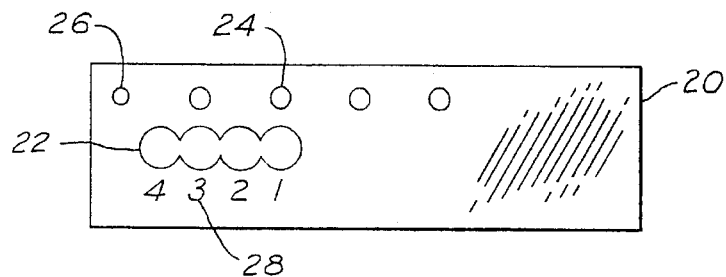
FIG. 5 is a face view of one cutting blade.
Figure 6:
FIG. 6 is an edge view of one cutting blade.

FIGS. 5 and 6 show one cutting blade 20 in face and edge views respectively. Said blade is made of any suitable material such as mild steel, hardened carbon steel, plastic, or other material that is reasonably strong and which may be fabricated or molded. Each blade contains a plurality of stepped mounting holes 22 and an equal number of stepped locking holes 24. Each blade also contains one or more locking dogs 26 for engagement with one of the stepped locking holes 24 in the mating blade. Each blade may be marked with sequential extension numbers 28 coined or molded into the surface of the blade material, preferably on both faces. Alternatively, extension numbers 28 may be provided by printing, decal, or adhesive backed label.

Figure 9:
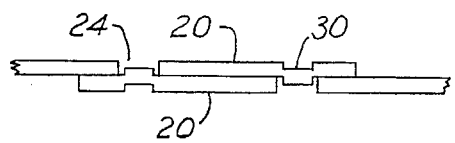
FIG. 9 is a sectional view (from FIG. 8) showing half punches in lieu of dogs.
Figure 9A:
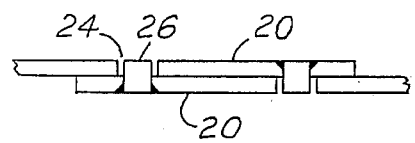
FIG. 9A is a sectional view (from FIG. 8) showing dogs (as in FIG. 4).
Figure 9B:
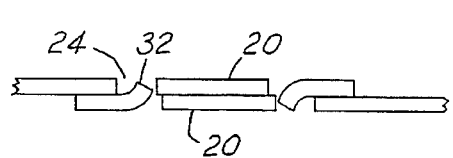
FIG. 9B is a sectional view (from FIG. 8) showing formed tangs in lieu of dogs.

There are various possibilities for forming the locking dogs 26, three such possibilities being illustrated in FIGS. 9, 9A and 9B. In FIG. 9 half punches 30 are shown, said half punches being formed in a punch press die or molded in a plastic molding machine. In FIG. 9A studs 26 are shown, said studs being welded or force fit into holes in the blades or molded in a plastic molding machine as an integral part of the blade. In FIG. 9B formed tangs 32 are shown, said tangs being formed in a punch press die, preferably.

OPERATION

A pair of extendible cutting blades 20 in this invention replaces the one piece blade usually found on lawn edging machines. The pair of extendible blades will outwear the one piece blade by a factor of four or more. It is possible to provide four or more extension positions.

Initial installation of a pair of extendible blades simply requires placing two blades 20 face to face with their number 1 mounting holes 22 alined and the two locking dogs 26 engaged with their opposing locking holes 24. Then, the pair of blades is mounted onto the drive shaft 38 through the number 1 mounting holes and fastened with washers 34 and nut 36 as shown in FIG. 2.

After the ends of the extendible blade pair have worn off sufficiently to warrant extension, one simply unbolts the pair, moves the two blades oppositely and outwardly so that their number 2 mounting holes are alined. One then re-assembles the pair back onto the drive shaft through the number 2 mounting holes, thus providing more more blade length for use. This lengthening is repeated when the ends of the blades have been worn off sufficiently to warrant the next extension for mounting onto the drive shaft through the number 3 mounting holes, and so on. FIG. 4 illustrates the blades in the process of being mounted through the number 3 mounting holes, the twice worn off ends being shown as phantom lines.

Figure 7:
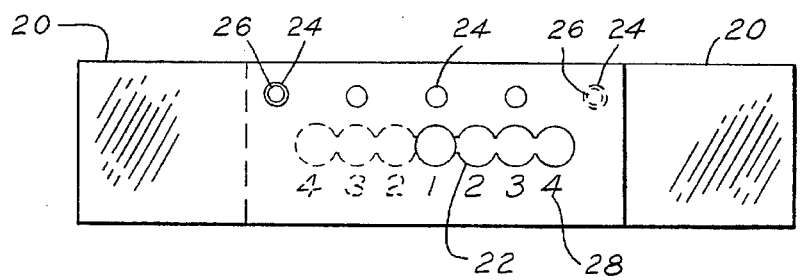
FIG. 7 is a face view of two cutting blades nested together in the initial position.
Figure 8:
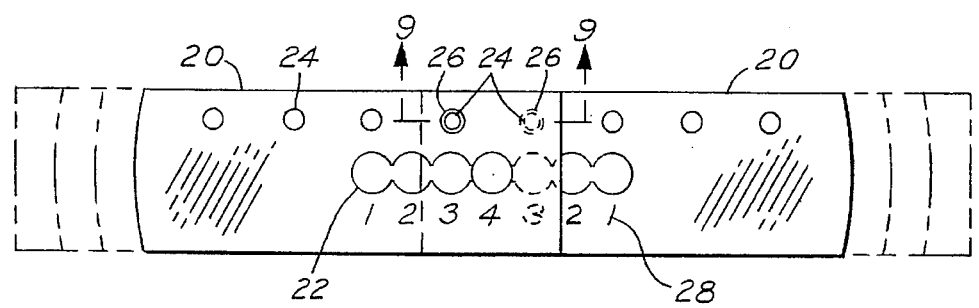
FIG. 8 is a face view of two cutting blades nested together in the fully extended position.

FIG. 3 illustrates the appearance of the cutter blade assembly 40 in its fully extended position. In this particular embodiment there are a total of four mounting hole 22 positions and FIG. 3 shows the blades 20 in the fourth position, mounted on the drive shaft 38 through the number 4 mounting hole 22. The thrice worn off ends are shown as phantom lines. FIGS. 7 and 8 are similar to FIGS. 2 and 3 respectively except that the drive shaft, nut, and washers have been omitted in FIGS. 7 and 8 and that the extension numbers 28 are shown in FIGS. 7 and 8.

Figure 10:
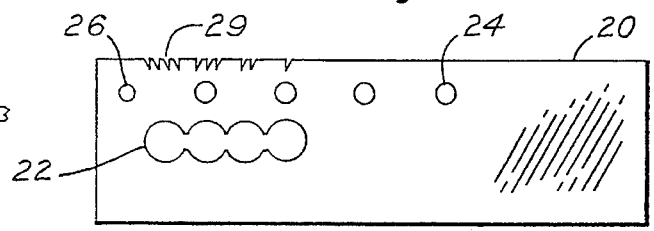
FIG. 10 is a face view of one cutting blade similar to FIG. 5 but showing edge alinement markings 29 in lieu of extension numbers 28.

FIG. 10 shows edge alinement markings 29 in lieu of extension numbers 28, said edge alinement markings being cut, coined, molded, or otherwise indicated on one or both edges of each cutting blade 20 as an aid in matching a pair of blades to the next successive mounting hole 22.

SUMMARY

Thus, one can see that a simple lawn edger cutting blade, provided with progressively placed, stepped mounting holes, when used as a nested pair will allow a person to re-use the blades several times. Whenever the blade ends are worn off the user only needs to disengage the blade pair from the drive shaft, move each blade radially and oppositely outward and re-engage each blade onto the drive shaft through the next-numbered moulting hole. This feature gives one the ability to extend the life of the blades significantly by compensating for wear.

It should be noted that although the above description together with the drawings show certain specific embodiments, variations are possible. For example, the cutting blades can be pre-sharpened, or the edge markings can be raised instead of depressed. Such variations should be considered within the scope of this invention.

We claim:

1. A cutter blade assembly for a lawn edging device comprising:

first and second blade members connectable to a powered drive shaft, said blade members having a cutting edge end and a mounting end, wherein the mounting ends are positioned side-by-side for connection therebetween;

said mounting ends including stepped mounting holes spaced at regular intervals so that extending the cutting blades from one mounting position to the next will result in an equal and balanced outward extension of the combined length of the two blades, thereby compensating for wear on the cutting edge ends of said two blades, connecting means for insertion through said stepped mounting holes for connecting the first and second blade members and means for preventing relative rotation between the first and second blade members when connected.

2. The cutter blade assembly of claim 1 wherein said means for preventing rotation include a series of stepped locking holes plus one locking dog provided in each cutting blade, said stepped locking holes being spaced at intervals double the spacing of the stepped mounting holes, the locking dog being located on each cutting blade so as to engage one of the stepped locking holes in the opposing blade whenever the blades are extended.

3. The cutter blade assembly of claim 2 wherein a second series of stepped locking holes plus a second locking dog are provided in each cutting blade.

4. The cutter blade assembly of claim 2 wherein identifying extension numbers are sequentially affixed adjacent to the mounting holes on each cutting blade, preferably on both faces.

5. The cutter blade assembly of claim 2 wherein identifying alinement markings are sequentially affixed to to the edge or edges of each blade adjacent to the mounting holes.

6. The cutter blade assembly of claim 1 wherein the two cutting blades being mounted flat side against flat side on the drive shaft present a wider cutting trench or groove in the soil than would a single cutting blade of the same material thickness.

* * * * *